US008259761B2

(12) United States Patent
Diab et al.

(10) Patent No.: US 8,259,761 B2
(45) Date of Patent: Sep. 4, 2012

(54) METHOD AND SYSTEM FOR MANAGING MULTIMEDIA TRAFFIC OVER ETHERNET

(75) Inventors: Wael William Diab, San Francisco, CA (US); Yongbum Kim, San Jose, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 249 days.

(21) Appl. No.: 11/923,080

(22) Filed: Oct. 24, 2007

(65) Prior Publication Data

US 2008/0285444 A1 Nov. 20, 2008

Related U.S. Application Data

(60) Provisional application No. 60/917,870, filed on May 14, 2007.

(51) Int. Cl.
*H04J 3/04* (2006.01)
*G04F 13/20* (2006.01)

(52) U.S. Cl. .......................... 370/535; 370/474; 710/313

(58) Field of Classification Search ........................ None
See application file for complete search history.

(56) References Cited

U.S. PATENT DOCUMENTS

| | | | |
|---|---|---|---|
| 5,909,564 A | 6/1999 | Alexander et al. | |
| 6,650,640 B1 | 11/2003 | Muller et al. | |
| 7,107,380 B1 | 9/2006 | Mohan | |
| 7,430,681 B1 | 9/2008 | Hobbs | |
| 2002/0015409 A1 | 2/2002 | Gao et al. | |
| 2002/0181486 A1* | 12/2002 | Cantwell | 370/419 |
| 2004/0047353 A1* | 3/2004 | Umayabashi et al. | 370/395.63 |
| 2004/0179521 A1 | 9/2004 | Kim et al. | |
| 2004/0221163 A1* | 11/2004 | Jorgensen et al. | 713/182 |
| 2005/0204027 A1* | 9/2005 | Claseman | 709/223 |
| 2006/0018328 A1* | 1/2006 | Mody et al. | 370/401 |
| 2006/0143335 A1* | 6/2006 | Ramamoorthy et al. | 710/58 |
| 2006/0230146 A1 | 10/2006 | Wang et al. | |
| 2007/0061414 A1 | 3/2007 | Bakke | |
| 2008/0052426 A1 | 2/2008 | Montag | |
| 2008/0101409 A1 | 5/2008 | West et al. | |
| 2008/0187028 A1 | 8/2008 | Lida | |
| 2008/0240152 A1 | 10/2008 | Quinn et al. | |
| 2008/0279186 A1 | 11/2008 | Winter et al. | |
| 2008/0284621 A1 | 11/2008 | Diab et al. | |
| 2008/0285444 A1* | 11/2008 | Diab et al. | 370/230.1 |

(Continued)

OTHER PUBLICATIONS

IEEE 802.1Q-2005, "IEEE Standard for Local and metropolitan area networks: Virtual Bridged Local Area Networks", May 19, 1006, p. 25-28, 75-77 and 279-280.*

(Continued)

*Primary Examiner* — Jianye Wu
(74) *Attorney, Agent, or Firm* — Duane S. Kobayashi

(57) ABSTRACT

Aspects of a method and system for managing multimedia traffic over Ethernet are provided. In this regard, multimedia traffic comprising one or more Ethernet frames may be identified via one or more headers comprising the frames and processed according to the identification. In this regard, general Ethernet traffic may be multiplexed into egress frames based on the identification. Similarly, ingress Ethernet frames may be demultiplexed into multimedia traffic and general traffic based on the identification. Headers utilized to identify and/or route multimedia traffic and general traffic may comprise Ethertype and/or subtype fields. Headers utilized to identify and/or route multimedia traffic and general traffic may comprise a connection identifier field. Similarly, Headers utilized to identify and/or route multimedia traffic and general traffic may comprise a data type field.

30 Claims, 10 Drawing Sheets

U.S. PATENT DOCUMENTS

2008/0285568 A1 11/2008 Oren et al.
2008/0285572 A1 11/2008 Diab
2008/0285576 A1 11/2008 Teener et al.
2008/0285643 A1 11/2008 Diab
2008/0288704 A1 11/2008 Diab et al.
2008/0288987 A1 11/2008 Teener et al.

OTHER PUBLICATIONS

Michael D. Johas Teener, "Audio/Video Bridging for Home Networks (IEEE 802.1 AV Bridging Task Group)," Joint ITU-T/IEEE Workshop on Carrier-class Ethernet, XP002509617, May 31-Jun. 1, 2007, pp. 1-35, Geneva.

* cited by examiner

METHOD AND SYSTEM FOR MANAGING MULTIMEDIA TRAFFIC OVER ETHERNET

CROSS-REFERENCE TO RELATED APPLICATIONS/INCORPORATION BY REFERENCE

This patent application makes reference to, claims priority to and claims benefit from U.S. Provisional Patent Application Ser. No. 60/917,870 filed on May 14, 2007.

The above stated provisional application is hereby incorporated herein by reference in its entirety.

FIELD OF THE INVENTION

Certain embodiments of the invention relate to signal processing. More specifically, certain embodiments of the invention relate to a method and system for managing multimedia traffic over Ethernet.

BACKGROUND OF THE INVENTION

The generation and rendering of high end graphics often involves the movement of large quantities of data. Frequently the data is stored in a server, from which it may be accessed by users at computer workstations via a network. Once the data is received at the computer workstation, the graphics may be displayed on an attached video monitor. In many cases the video monitor is physically separate and has been conventionally attached to the computer workstation via an analog interface, such as a video graphics array (VGA) interface, or a digital interface such as a digital visual interface (DVI). In a typical configuration, an interface in the computer workstation is connected to a compatible interface in the video monitor via an interstitial connector, such as a cable.

The ever increasing amount of multimedia content, and in particular, high quality multimedia content is presenting a number of challenges to designers and administrators of computing platforms and network alike. For example, bandwidth, hardware, and the isochronous nature of multimedia file transfers are all factors limiting the quality and availability of the multimedia content. In this regard a number of standards have been developed for transporting high quality multimedia data for presentation. For example, the digital video interface (DVI) and High Definition Multimedia Interface (HDMI) represent two of the most widely adopted and utilized display interfaces. However, DVI and HDMI each have a number of drawbacks which Video electronics Standards Association (VESA) has attempted to address with the newly emerging DisplayPort (DP) standard. In this regard, DP may offer, for example, increased bandwidth and more advanced copy protection as compared to DVI or HDMI.

Display Port is a digital interface standard, which enables a computer workstation to send graphics and video data to a video monitor, or multimedia display device, via a Display Port interface. In this regard, the Display Port interface standard may describe a point-to-point interface, which is capable of transmitting data from a device connected at one end of a connecting cable to a device connected at the other end of the connecting cable. The graphics and/or video data communicated across the Display Port interface may be sent in mini-packets as described in applicable standards. The mini-packets may contain information comprising instructions on how to render the graphics and/or video data on the video display screen, for example. The mini-packets may be sent via a plurality of data paths referred to as "lanes". In an exemplary Display Port interface, there may be four (4) such lanes.

In addition to supporting unidirectional data traffic from the workstation to the computer monitor (or other attached video display device), the Display Port standard may also enable the bidirectional transfer of data. For example, the Display Port standard may allow for the exchange of encryption keys to enable the transfer of encrypted digital data across the Display Port interface. This capability may enable protection of digital content transferred across the Display Port interface. In addition, the bidirectional traffic capability of the Display Port interface may enable communication of computer mouse and/or keyboard data to the computer workstation. For example, mouse clicks to specific regions on the screen, or keyboard responses to the screen display may result in the generation of data across the Display Port interface in the direction of the video display device to the computer workstation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing multimedia traffic over Ethernet, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for integrating Ethernet and HD multimedia processing functions into a LAN subsystem. Various aspects of the invention may extend the point-to-point limitation of conventional display interfaces, to enable transfer of high definition (HD) multimedia data across a network, such as a local area network (LAN). For example, a computer graphics server located in a computing cluster may be able to transfer HD multimedia data across a network, to a destination computing device, for example. The destination computing device may then transfer the received HD multimedia data to one or more multimedia display devices via one or more point-to-point connections between the destination computing device and the attached multimedia display devices. In this regard, various embodiments of the invention may support high performance graphics within low-cost destination computing devices without requiring costly high performance graphics processing hardware and/or software.

Aspects of a method and system for managing multimedia traffic over Ethernet are provided. In this regard, multimedia traffic comprising one or more Ethernet frames may be identified via one or more headers comprising the frames and processed according to the identification. In this regard, general Ethernet traffic may be multiplexed into egress frames based on the identification. Similarly, ingress Ethernet frames may be demultiplexed into multimedia traffic and general traffic based on the identification. Headers utilized to identify and/or route multimedia traffic and general traffic may comprise Ethertype and/or subtype fields. Headers utilized to identify and/or route multimedia traffic and general traffic may comprise a connection identifier field. Similarly, Headers utilized to identify and/or route multimedia traffic and general traffic may comprise a data type field.

Figure 1A:
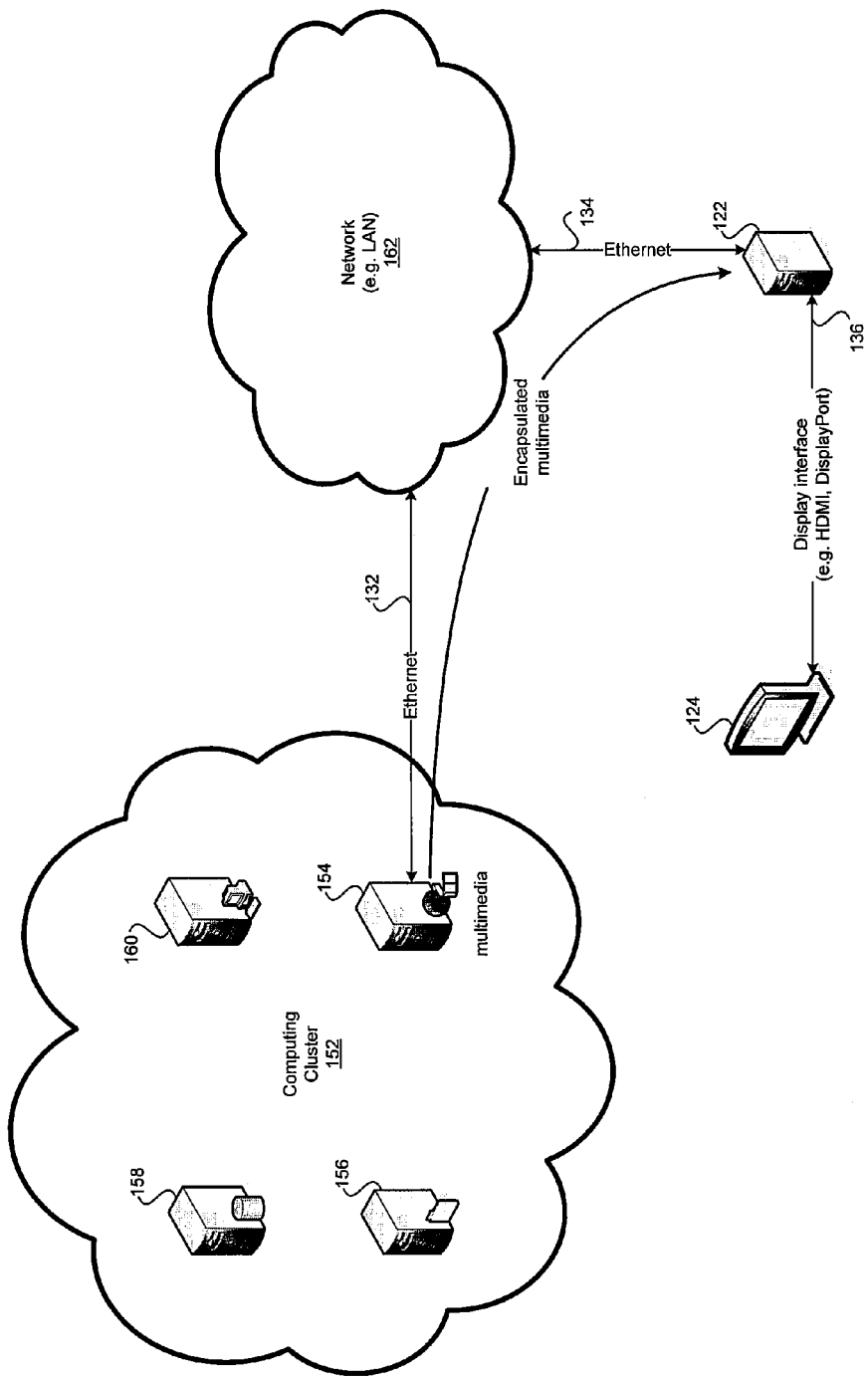
FIG. 1A is a diagram illustrating an exemplary system for transfer of high definition multimedia data across a network, in accordance with an embodiment of the invention.

FIG. 1A is a diagram illustrating an exemplary system for transfer of HD multimedia data across a network, in accordance with an embodiment of the invention. Referring to FIG. 1A, there is shown a computing cluster 152, a network 162, a computing device 122 and a multimedia monitor 124. The computing cluster 152 may comprise a multimedia server 154, a file server 156, a database server 158 and a network management server 160.

The computing cluster 152 may comprise a plurality of servers, each of which may perform one or more specific tasks, or execute one or more specific applications. Each server may store data which may be accessible to users at computing devices 122, which are attached to the network 162. The servers within the computer cluster 152 may communicate with each other, and/or with the network 162 via Ethernet interfaces. The video server 154 may store computer graphics data in addition to storing video, audio and/or multimedia programs. The multimedia monitor 124 may enable the rendering and display of visual images comprising video and/or graphics, for example.

The video server 154 may comprise hardware and/or software, which enables processing of graphics, video, audio and/or multimedia data. The computer multimedia, graphics, video, and/or audio (collectively referred to herein as multimedia) stored at the video server 154 may be accessible via the network 162. The file server 156 may store one or more files. The file server 156 may be utilized, for example, to store files from various users. The database server 158 may store one or more database programs, applications and/or files. The network management server 160 may store information pertaining to the configuration and/or availability of various network communications devices and/or interfaces. The network management server 160 may utilize a protocol such as the simple network management protocol (SNMP). The computing device 122 and multimedia monitor 124 may communicate via a display interface such as DVI, HDMI, or DisplayPort. The computing device 122 may communicate with the network 162 via an Ethernet interface.

In an exemplary operation, the video server 154 may encapsulate HD multimedia data in one or more Ethernet frames. The format of the Ethernet frames may be specified in applicable standards documents, such as IEEE 802 standards. The Ethernet frames may contain an address (for example, in a destination address field within the Ethernet frames), which indicates that the Ethernet frames are to be transported across the network 162, and delivered to the computing device 122. The Ethernet frames may comprise a designation (for example, in an EtherType field of the Ethernet frames), which indicates that the Ethernet frame is being utilized to encapsulate HD multimedia of a particular format. Formats may include, for example, HDMI and DisplayPort. The Ethernet frames may also comprise a traffic class identifier, which may enable the network 162 to provide services in accordance with Audio/video Bridging and/or Audio/Video Bridging extensions (any combination of which is referred to herein as "AVB"). These services may comprise prioritized transport of the Ethernet frames across the network 162 to enable the time duration for transport across the network 162 to meet latency targets associated with the specified traffic class.

The video server 154 may transport the Ethernet frames via an Ethernet interface connector 132 to the network 162. The Ethernet frames may subsequently be transported from the network 112 to the computing device 122 via an Ethernet interface connector 134. An exemplary Ethernet interface connector may be a category 5 cable.

Upon receipt of the Ethernet frames, the computing device 122 may determine (for example, based on an identifier in the EtherType field of the received Ethernet frames) that the received Ethernet frames contain HD multimedia content. The computing device 122 may extract the multimedia content and may send it to the multimedia monitor 124 via the display interface connector 136. The display interface connector 136 may enable physical connection between the computing device 122 and the multimedia monitor 124 via a point-to-point connection. The HD multimedia content may then be rendered for display at the multimedia monitor 124.

In various embodiments of the invention, point-to-point oriented traffic, which may not be network aware or contain a means of network identification (such as a network destination address, for example) may be encapsulated in Ethernet frames at a centralized server (such as a video server 154), and transported across a network 162 (such as a LAN, for example). The point-to-point oriented traffic may comprise HD multimedia content such as Display Port micro-packets, or even raw data generated by an application program. The encapsulated traffic may be de-encapsulated at a network destination device (such as the computing device 122) and delivered to a destination multimedia device (such as the multimedia monitor 124). Thus, in various embodiments of the invention, from the perspective of the application(s), which enable the generation of the point-to-point oriented traffic (such as Display Port, for example), the centralized server (such as the video server 154) may transport the point-to-point oriented traffic to the destination multimedia device 124 across a network 162 as though the multimedia device 124 were directly attached to the centralized server via a Display Port interface.

In various embodiments of the invention, the tasks required of the computing device 122 may comprise reception of Ethernet frames via the Ethernet interface connector 134, determination that the Ethernet frames may contain encapsulated HD multimedia content, extraction of the HD multimedia content from the Ethernet frames, and transfer of the content to the multimedia monitor 124 via the display interface connector 136. In this regard, the video server 154 may generate instructions for rendering the video data on the multimedia monitor 124 within the Display Port mini-packets instead of requiring that this task be performed within the computing device 122. Thus, various embodiments of the invention may enable the computing device 122 to be a "thin client" device, which may not require high performance hardware and/or software capabilities to enable the generation of multimedia content for high performance video and/or graphics applications. This in turn may enable the rendering of high performance video and/or graphics on multimedia monitors 124 which are attached to low cost computing devices 122.

Figure 1B:
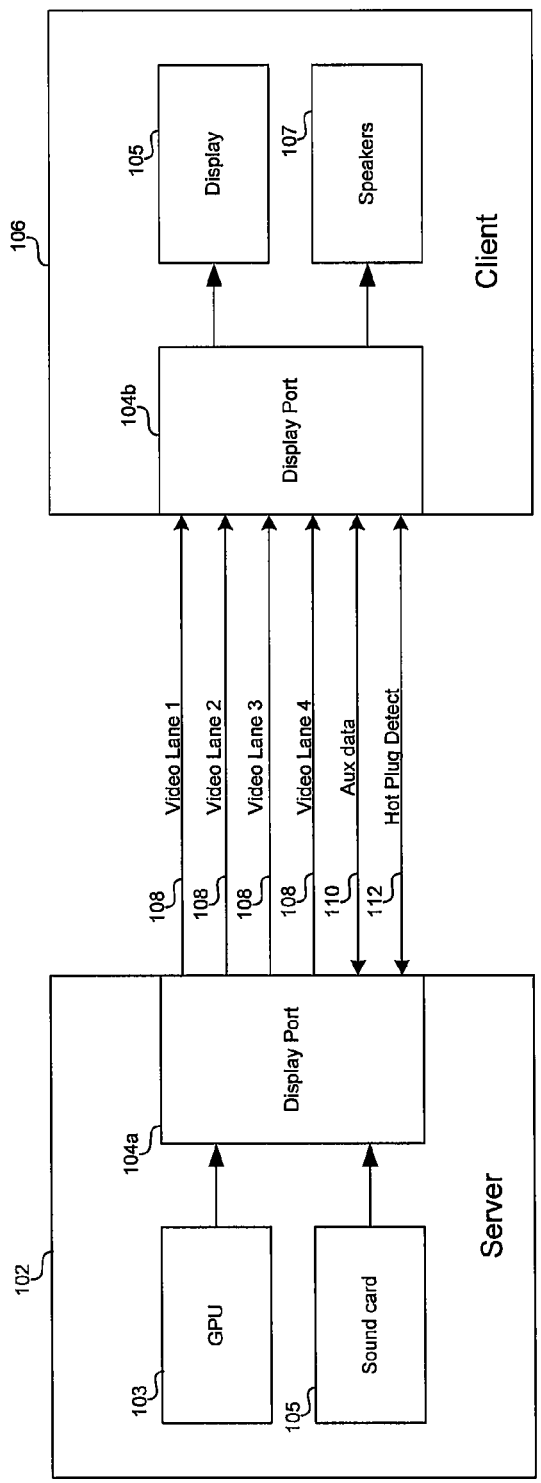
FIG. 1B is block diagram illustrating a DP interface, in connection with an embodiment of the invention.

FIG. 1B is block diagram illustrating a DisplayPort (DP) system, in connection with an embodiment of the invention. In this regard, DisplayPort is an exemplary display interface that may be utilized for conveying HD multimedia data. Referring to FIG. 1B there is shown a server 102 and a client 106, each comprising a DP interface 104. Although, only a single client is shown, various embodiments of the invention may utilize a server or other communication device to transmit DP data to multiple clients.

The server 102 may comprise suitable logic circuitry, and/or code that may enable generating and/or outputting multimedia data. In this regard, the server 102 may comprise a graphics processing unit (GPU) 103 which may generate video data and convey the audio/video data to the DP interface 104a. Similarly, the server 102 may comprise a sound card 105 which may generate audio data and convey the audio data to the DP interface 104a. Accordingly, the DP interface 104a may encapsulate the data into multimedia DP micro-packets and may transmit the micro-packets on one or more of the lanes 108 and 110. In this regard, the DisplayPort micro-packets may contain instructions and/or information, in micro-packet headers for example, to enable rendering of the multimedia data at the client 106.

The client 106 may comprise suitable logic circuitry, and/or code that may enable rendering and/or presenting multimedia data. In this regard, the server 102 may comprise a display 105 which may be enabled to receive video data from the DP interface 104b and present the video information to a user. Similarly, the server 102 may comprise speakers 107 which may be enabled to receive audio data from the DP interface 104b and present the audio information to a user. Accordingly, the DP interface 104b may de-packetize and/or reformat received DP micro-packets and may output audio/video data in a format suitable for rendering or presentation by the display 105 and/or the speakers 107. In this regard, instructions and/or control data contained in the DP micro-packets may be utilized for the rendering/presentation of the multimedia data.

Each of the video lanes 108 may comprise a physical link, such a twisted pair. The number of lanes utilized for any given multimedia content may depend on factors such as resolution, bits per pixel (bpp), and bits per component (bpc). Additionally, each of the lanes may operate at a link rate of 1.62 Gbps or 2.7 Gbps.

The auxiliary data lane 110 may comprise a physical link, such a twisted pair. The auxiliary lane 110 may be utilized to initialize and/or setup a link between the server 102 and the client 104. The auxiliary lane 110 may also carry remote control command data and/or other auxiliary/control data to/from the client 106. For example, the auxiliary lane may carry keyboard and/or mouse commands form the client 106 to the server 102. Additionally, the auxiliary lane may carry audio data from the server 102 to the client 106.

The hot plug detect lane 112 may comprise a physical link, such a twisted pair, the hot plug detect lane 112 may enable the server to detect the connection of a client. Additionally, the hot plug detect lane 112 may enable the client to signal a loss of synchronization or connection to the server.

In operation, the system 100 may be limited in terms of distance between the server 102 and client 106 due to limitations of the DP interface. Additionally, incorporating the DP interface 104a, and 104b into the server 102 and the client 106 may be infeasible with existing platforms and technology due to cost and/or space constraints, for example. Furthermore, DisplayPort has limited or no network awareness. In this regard, DisplayPort was designed to carry Audio/Video traffic via an interstitial connector over relatively short distances.

Figure 2:
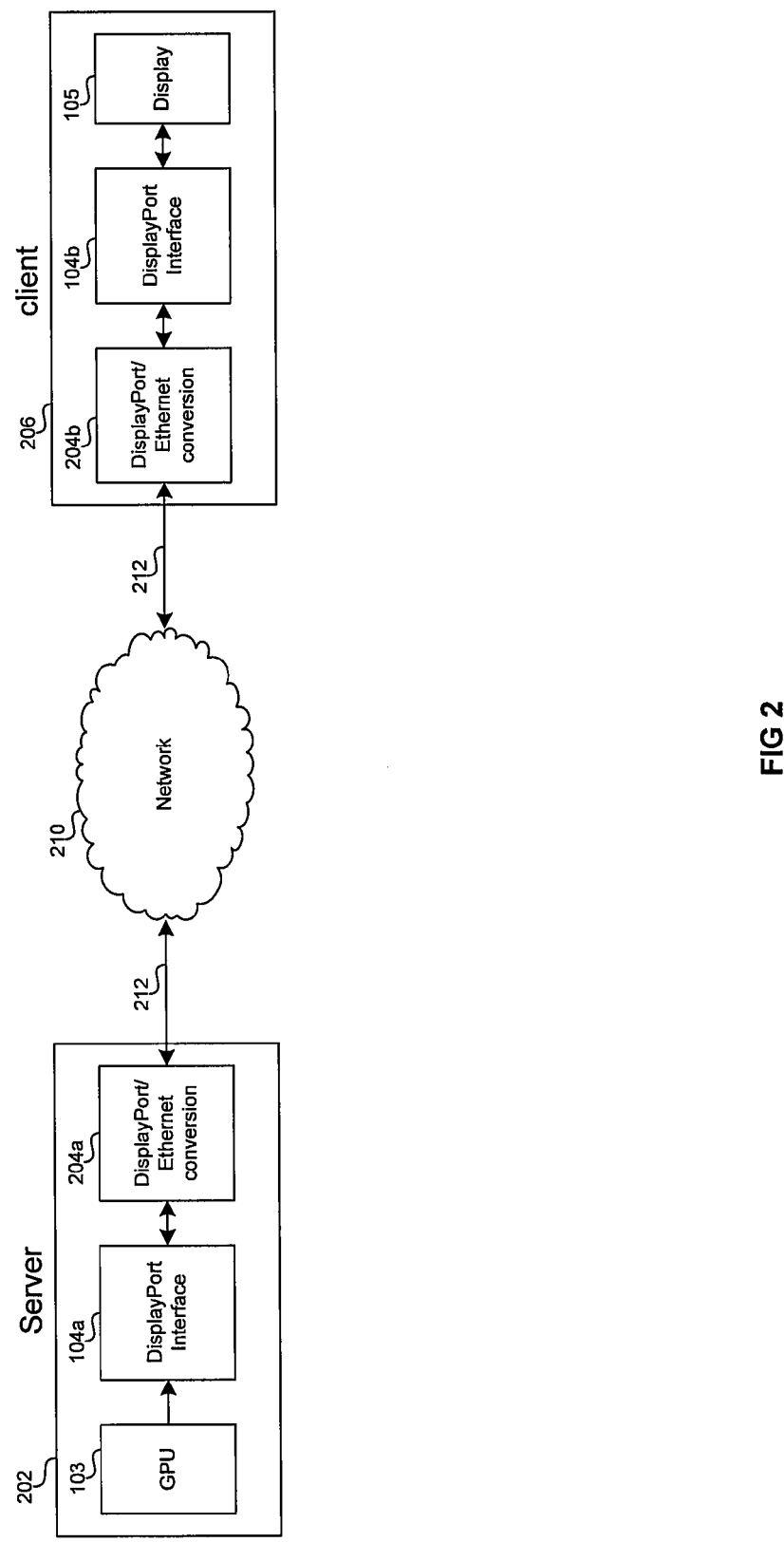
FIG. 2 is a diagram illustrating transmission of HD multimedia content over a network, in accordance with an embodiment of the invention.

FIG. 2 is a diagram illustrating transmission of HD multimedia content over a network, in accordance with an embodiment of the invention. In this regard, FIG. 2 depicts an exemplary embodiment wherein the HD multimedia content is in the form of DisplayPort micro-packets. Referring to FIG. 2 there is shown a server 202 and a client 206 which may exchange DP traffic via the network 210. Although, only a single client is shown, various embodiments of the invention may utilize a server or other communication device to transmit DP data to multiple clients.

The server 202 may comprise suitable logic circuitry, and/or code that may enable generating and/or outputting HD multimedia data. In this regard, the server 202 may be similar to the server 102 of FIG. 1, but may additionally comprise a DP/Ethernet conversion block 204a. In various embodiments of the invention, the server 202 may comprise a computing device such as desktop computer or a laptop computer.

The DP/Ethernet conversion block 204a may comprise suitable logic, circuitry, and/or code that may enable conversion a DP datastream to an Ethernet datastream. In this manner, a DP datastream may be transmitted across the network 210 to the client 206. In various embodiments of the invention, the server 202 may comprise a computing device such as desktop computer or a laptop computer. Additionally, the display 105 may be integrated into the client 206 or may comprise a collocated monitor connected via a point-to-point connection.

The client 206 may comprise suitable logic circuitry, and/or code that may enable rendering and/or presenting multimedia data. In this regard, the client 206 may be similar to the client 106 of FIG. 1, but may additionally comprise an Ethernet/DP conversion block 208.

The DP/Ethernet conversion block 204b may comprise suitable logic circuitry, and/or code that may enable conversion of an Ethernet datastream to a DP datastream. In this regard, the Ethernet/DP conversion block 204b may enable exchanging DP data with the server 202 via the network 210.

The network 210 may comprise one or more physical links and/or network hardware devices. In an exemplary embodiment of the invention the network 210 may comprise one or more Ethernet switches, and/or one or more unshielded twisted pair cables with 8 position 8 conductor (8P8C) modular connectors on either end.

In an exemplary operation, the display 105 may be detected by the DP interface 104b and the appropriate DisplayPort configuration data (DPCD) may be encapsulated into a DP datastream and conveyed to the DP/Ethernet conversion block 204b. The DP datastream containing the DPCD may thus be converted into an Ethernet datastream and transmitted into the network 210. In this regard, packets comprising the datastream may be tagged or may otherwise comprise header information that may be utilized to identify and/or process Ethernet frames containing DP data. Upon arriving at the DP/Ethernet conversion block 204a, the Ethernet datastream comprising the DPCD may be converted back to a DP datastream and passed to the DP interface 104a. In this manner, a DP connection may be established across the network 210 as if the DP interfaces 104a and 104b were communicating directly with each other. However, DP is intended as a point to point interface and requires the exchange of time sensitive synchronous and isochronous data. Consequently, converting the DP data stream to an Ethernet datastream and transmitting it across a network with uncertain bandwidth and/or latency may result in the DP interfaces being unable to process the DPCD and/or establish a reliable DP connection.

Similarly, even if a DP connection is established over the network 210, network bandwidth and/or latencies may result in poor video quality at the client 105. Accordingly, Audio/Video Bridging protocols may be utilized by the server 202 and the client 206 to establish a network path over which a DP connection may exist. In this regard, prior to establishing a DP connection and/or prior to transmission of data over that connection, an Audio/Video Bridging protocol such as IEEE 802.1AS may be utilized to synchronize the client 206 and the server 202. Additionally, an Audio/Video Bridging protocol such as IEEE 802.1Qat may be utilized to reserve resources across the network 210. Also, nodes comprising the reserved path may implement IEEE 802.1Qav to govern forwarding and queuing of the time sensitive data.

After synchronization, and establishment of a DP connection, the server 202 may begin transmission of multimedia data into the network 210. For example, the GPU 103 may generate an elementary video stream and may convey the stream to the DP interface 104a. The DP interface 104a may receive the elementary video stream and may packetize it into a DP datastream. Accordingly, the DP micro-packets and associated control/auxiliary data may be conveyed to the Ethernet/DP conversion block 204a which may convert the DP datastream to an Ethernet datastream and may transmit it onto a first link comprising the network path reserved via N Bridging protocols. In this regard, packets comprising DP data may comprise header information that may be utilized to identify and/or process Ethernet frames containing DP data. The Ethernet datastream may be received at the client 206 and may be converted back to a DP datastream by the DP/Ethernet conversion block 204b. Subsequently, the DP datastream may be conveyed to the DP interface 104b where it may be processed and the elementary video stream may be extracted/reconstructed from the DP datastream. The elementary video stream may then be conveyed to the display where it is rendered and/or presented to a user.

In various embodiments of the invention, the tasks required of the client 206 may comprise reception of Ethernet datastreams, determination that the Ethernet datastreams may contain encapsulated DisplayPort micro-packets, de-encapsulation of the DisplayPort micro-packets, and transfer of the de-capsulated Display Port micro-packets to the display 105 via the Display Port interface 104b. In this regard, the video server 202 may generate instructions for rendering the video data on the display 105 within the Display Port mini-packets instead of requiring that this task be performed within the client 206. Thus, various embodiments of the invention may enable the client 206 to be a "thin client" device, which is not required to comprise high performance hardware and/or software capabilities to enable the generation of Display Port mini-packets for high performance video and/or graphics applications. This in turn may enable the rendering of high performance video and/or graphics on displays, such as the display 105, which are attached to low cost clients 206.

Figure 3:
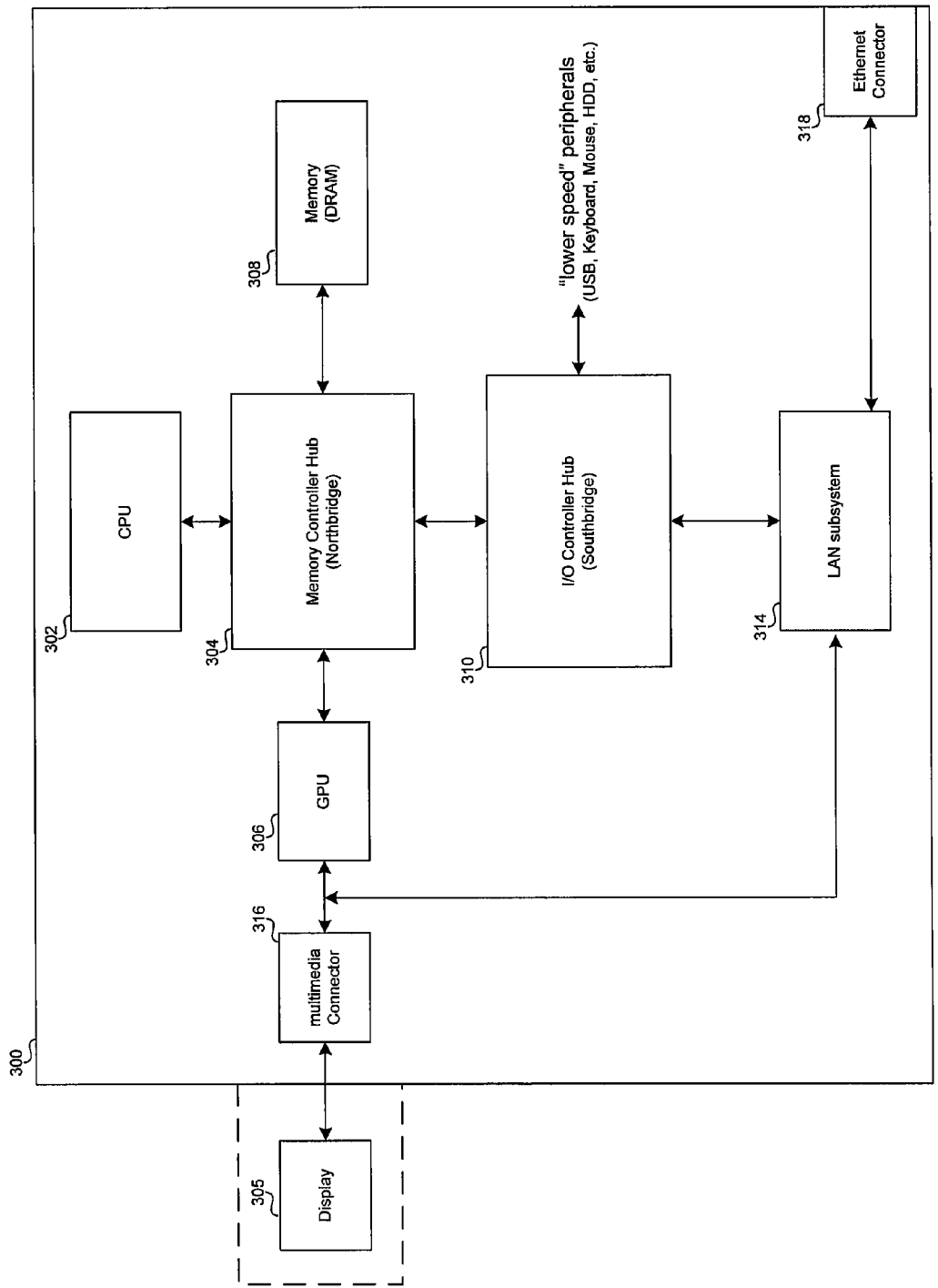
FIG. 3 is a diagram illustrating an exemplary system enabled to transmit and/or receive DP and/or Ethernet datastreams, in accordance with an embodiment of the invention.

FIG. 3 is a diagram illustrating an exemplary system enabled to transmit and/or receive Display Port and/or Ethernet data streams, in accordance with an embodiment of the invention. Referring to FIG. 3 the system 300 may comprise a CPU 302, a memory controller hub (MCH) 304, a graphics processing unit (GPU) 306, a memory block 308, an input/output controller hub (ICH) 310, a low speed peripheral block 312, a LAN subsystem 314, a multimedia connector 316, an Ethernet connector 318a, an Ethernet connector 318b and memory 320.

The CPU 302 may comprise suitable logic, circuitry, and/or code that may enable processing data and/or controlling operations of the system 300. In this regard, the CPU 302 may be enabled to provide control signals to the various other blocks comprising the system 300. The CPU 302 may also enable execution of applications programs and/or code. The applications programs and/or code may enable generation of uncompressed video and/or graphics. The CPU 302 may also enable the retrieval of stored uncompressed video and/or graphics. The CPU 302 may be accessed via the MCH 304.

The MCH 304 may comprise suitable logic, circuitry, and/or code that may enable the storage and/or retrieval of data at high data transfer rates. For example, the MCH 304 may enable retrieval and/or storage of uncompressed video and/or graphics data for high performance applications, such as high definition video, high resolution 3-D graphics, &c. In various embodiments of the invention, the MCH 304 may be referred to as a northbridge (NB).

The GPU 306 may comprise suitable logic, circuitry, and/or code for generating, rendering, and/or manipulating graphics data. The GPU 306 may output uncompressed video and/or graphics. The GPU 306 may also output encrypted uncompressed video and/or graphics for applications that utilize digital content protection, for example. The GPU 306 may encapsulate the uncompressed video and/or graphics in Display Port mini-packets. The Display Port mini-packets generated by the GPU 306 may also comprise instructions, which enable rendering of the uncompressed video and/or graphics for display on a multimedia monitor 124 (FIG. 1). The GPU 306 may also output protocol data units associated with other high definition (HD) protocols. The GPU 306 may comprise Display Port PHY layer functionality, which enables the GPU 306 to send and/or receive Display Port mini-packets via the multimedia connector 316.

The memory 308 may comprise suitable logic, circuitry, and/or code that may enable the storage and/or retrieval of data. For example, the memory 308 may enable the storage and/or retrieval of video and/or graphics data. The memory 308 may also enable the storage and/or retrieval of encryption keys, which may be utilized for encryption and/or decryption of data. The memory 308 may additionally store data, for example, configuration data and/or state variables utilized in controlling/configuring the various blocks of the system 300. The memory 308 may also enable the storage of code, which enables the execution of multimedia applications, for example. The memory 308 may utilize various technologies, such as dynamic random access memory (DRAM), which enable data to be stored and/or retrieved at sufficiently high data rates to enable high performance multimedia applications, for example.

The ICH 310 may comprise suitable logic, circuitry, and/or code that may enable the storage and/or retrieval of data from peripheral devices such as hard disk drives. The ICH 310 may also enable the retrieval of input signals and/or interrupt signals from peripheral devices, such as keyboard device and mouse devices, and/or other peripheral devices including various peripheral component interconnect (PCI) devices, for example. In various embodiments of the invention, the ICH 310 may be referred to as a southbridge (SB).

The LAN subsystem 314 may comprise suitable logic, circuitry, and/or code to enable the transmission and/or reception of Ethernet frames. The LAN subsystem 314 may comprise PHY layer functions and MAC layer functions. The LAN subsystem 314 may enable transmission and/or reception of Ethernet frames at various transfer rates, such as 10 Mbps, 100 Mbps, 1,000 Mbps (or 1 Gbps) and/or 10 Gbps, or other rates (for example, higher rates). The LAN subsystem 314 may also enable transmission and/or reception of Ethernet frames via wireless LANs (WLAN).

The PHY layer functions may enable transmission of Ethernet frames via a communication medium. The PHY layer functions may also enable reception of Ethernet frames via the communication medium. The PHY layer functions may generate signals for transmission that are suitable for the physical medium being utilized for transmitting the signals. For example, for an optical communication medium, the PHY layer may generate optical signals, such as light pulses, or for a wired communication medium, the PHY layer may generate electromagnetic signals.

The MAC layer functions may enable orderly communication between systems that are communicatively coupled via a shared communication medium. The MAC layer may comprise one or more coordination functions (CF) that enable a system to determine when it may attempt to access the shared communication medium. For example, in a wired communication medium, for example Ethernet, a CF may utilize a carrier sense multiple access with collision detection (CSMA/CD) algorithm. The MAC layer functions may implement mechanisms for scanning the communication medium to determine when it is available for transmission of signals. The MAC layer functions may comprise back off timer mechanisms, which may be utilized by a system to determine how often to attempt to access a communication medium, which is currently determined to be unavailable.

The MAC layer functions may also enable AV Bridging capabilities. In this regard, the MAC layer functions may determine a traffic class which is associated with transmitted Ethernet frames. Based on the determined traffic class, the MAC layer functions may perform traffic shaping by determining a time instant at which an Ethernet frame may be sent to the network via the Ethernet interface. That time instant may be determined based on a time instant at which one or more preceding Ethernet frames were also transmitted via the Ethernet interface. The time instant may also be determined based on stored "credits", which may indicate a quantity of octets of Ethernet frame data that may be transmitted at "line rate" before transmission of subsequent Ethernet frames is suspended pending the accumulation of additional credits.

The MAC layer functions, which support AV Bridging, may also enable the end-to-end transport of Ethernet frames based on specified latency targets by initiating admission control procedures. The latency targets, which may specify a maximum time duration for the transport of Ethernet frame across the network, may be determined based on a specified traffic class. A destination Ethernet device may initiate admission control procedures by initiating a registration request across the network to the source Ethernet device. A successful registration may enable the network to reserve resources for the transport of Ethernet frames between the source Ethernet device and the destination Ethernet device, in accordance with the specified latency targets.

The Ethernet MAC layer functions may also enable an exchange of timing synchronization information between communicating Ethernet devices. Individual Ethernet MAC layer functions associated with each of a plurality of Ethernet devices within a LAN may exchange timing synchronization with the Ethernet MAC layer function associated with a specified Ethernet device associated with the LAN, wherein the specified Ethernet device may provide system timing for the plurality of Ethernet devices associated with the LAN. The traffic shaping and/or timing synchronization capabilities may enable AV Bridging services to support isochronous and/or real time services, such as streaming media services.

In various embodiments of the invention, the MAC layer functions within the LAN subsystem 314 may enable the reception of Display Port mini-packets and encapsulation of the received Display Port mini-packets within Ethernet frames. The Ethernet frames may utilize AV Bridging services when being transmitted via the network 112. The MAC layer functions within the LAN subsystem 314 may also enable the reception of Ethernet frames and the de-encapsulation of Display Port mini-packets from Ethernet frames, which are determined to contain encapsulated Display Port mini-packets.

In various embodiments of the invention, the LAN subsystem 314 may utilize code, such as firmware, and/or data stored within the memory 320 to enable the operation of MAC layer functions and/or PHY layer functions within an Ethernet LAN, for example. The firmware may also enable encapsulation of Display Port mini-packets and/or uncompressed video and/or graphics in Ethernet frames within the LAN subsystem 314. In addition, the firmware may enable de-encapsulation of Display Port mini-packets and/or uncompressed video and/or graphics from Ethernet frames.

The multimedia interface connector 316 may enable physical connection to a multimedia interface, such as DVI, HDMI, or DisplayPort. In one embodiment of the invention, connector 316 may be a DisplayPort connector and the physical link may comprise at least conductors for each of the 4 lanes in the Display Port interface and for an auxiliary (AUX) lane. The 4 video lanes may enable the transmission or reception of Display Port mini-packets containing video data, while the AUX lane may enable transmission and reception of audio signals, control signals, input from peripheral devices such as keyboards and/or mice, and encryption keys. In various embodiments of the invention, the multimedia interface connector 316 may connect the system 300 to a display 305.

The Ethernet connector 318 may enable physical connection to an Ethernet Physical link which may comprise, for example, one or more twisted pairs. The Ethernet connector 318 may enable physical connection via an 8P8C modular connector, such as a RJ-45 connector, for example. In various embodiments of the invention, the Ethernet connector 318 may provide a physical connection to enable communication of general Ethernet traffic, and/or multimedia traffic utilizing AV Bridging protocols between the system 300 and a remote system. In various embodiments of the invention, a single Ethernet connector 318 may be utilized for Ethernet and DP traffic in which case the multimedia connector 316 may be absent. In various other embodiments of the invention, a single multimedia connector 316 may be utilized for Ethernet and DP traffic in which case the DP connector 318 may be absent.

In various embodiments of the invention, the system 300 may also be enabled to convert between multimedia formats. For example, the system 300 may be enabled to receive HDMI data via the Ethernet connector 318, convert the data to DP, and transmit the DP data via the multimedia connector 316.

In an exemplary transmit operation, the system 300 may represent a server, such as the server 202 of FIG. 2 and may transmit data via an Ethernet and/or a DisplayPort connection. For example, the GPU 306 may output a video stream to the LAN subsystem 314. In various embodiments of the invention, the LAN subsystem 314 may convert DP datastreams to Ethernet datastreams similar to the DP/Ethernet conversion block 204A of FIG. 2. In this regard, packets comprising the datastream may be tagged or may otherwise comprise header information that may be utilized to identify that they contain DP data. Additionally, the LAN subsystem 314 may convert the Ethernet datastreams to physical symbols and may output the physical symbols via the Ethernet connector 318. In another example, audio and/or combined audio/video may be transmitted in a similar manner.

In an exemplary receive operation, the system 300 may represent a client, such as the client 204 of FIG. 2, and may receive data via an Ethernet and/or a multimedia connection. In this regard, the system 300 may receive physical symbols via the Ethernet connector 318, and may convert these symbols to bits of data. Additionally, the LAN subsystem 314 may assemble the data into Ethernet and/or multimedia datastreams accordingly. A multimedia datastream received via the multimedia connector 316 may comprise auxiliary data associated with a multimedia connection to the display 305. In this regard, the LAN subsystem may convey the auxiliary data to an appropriate block comprising the system 300 or may convert the multimedia datastreams to an Ethernet datastream for transmission to a remote system. An Ethernet datastream received via the Ethernet connector 318 may comprise a multimedia datastream encapsulated in an Ethernet datastream. In this regard, packets comprising the datastream may comprise header information that may be utilized to identify and/or process Ethernet frames containing multimedia data. Accordingly, the LAN subsystem 314 may extract/reconstruct the multimedia datastream from the Ethernet datastream. In this manner, the LAN subsystem may be similar to the DP/Ethernet conversion block 204b of FIG. 2. Accordingly, the multimedia datastream may be output to the display 305 via the multimedia connector 316. The display 305 may render or otherwise manipulate the video data contained in the multimedia datastream for presentation to a user. In another example, audio and/or combined audio/video may be received and presented in a similar manner.

Figure 4:
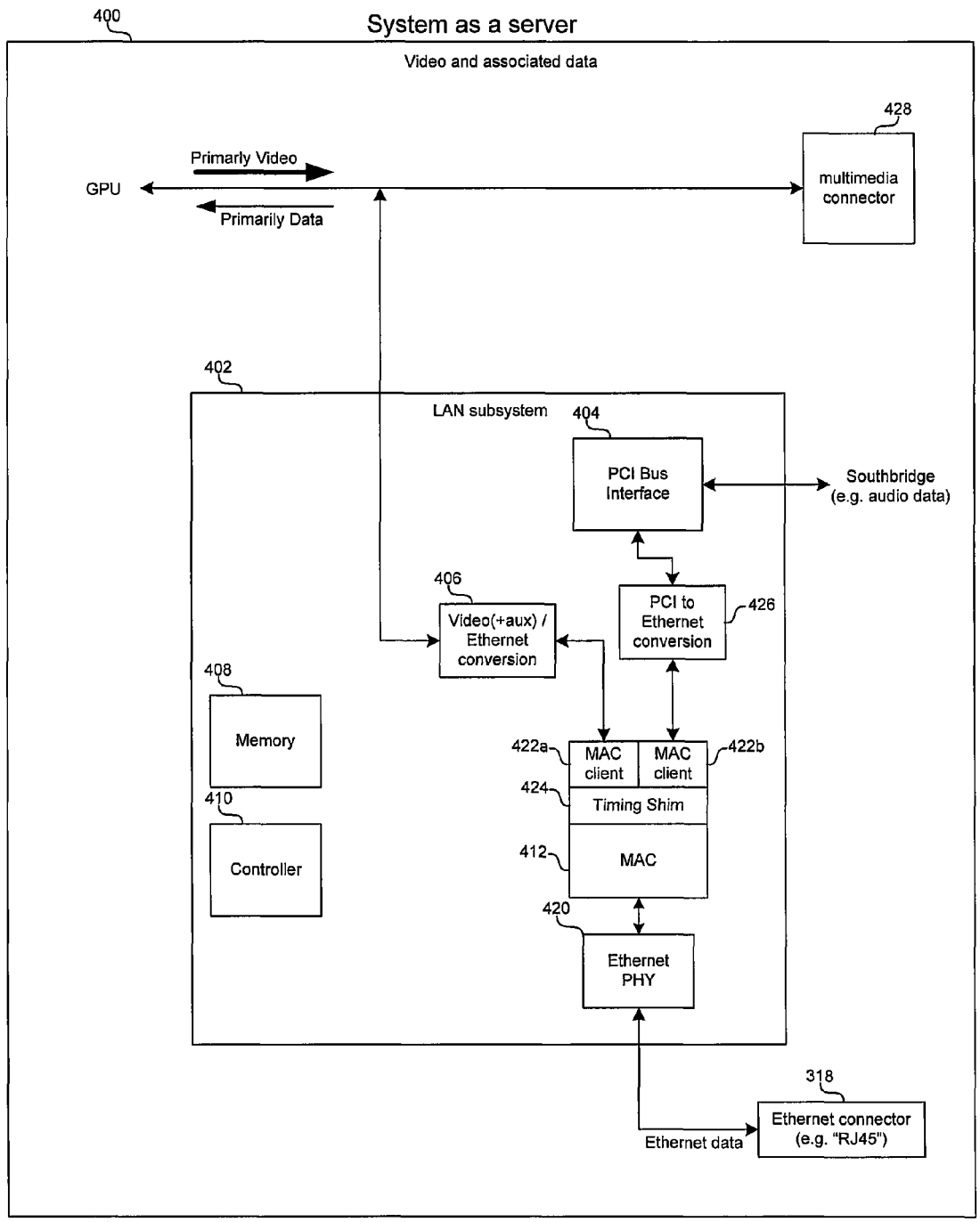
FIG. 4 is a block diagram illustrating an exemplary LAN subsystem of a multimedia server, in accordance with an embodiment of the invention.

FIG. 4 is a block diagram illustrating an exemplary LAN subsystem of a multimedia server, in accordance with an embodiment of the invention. Although the system 400 in FIG. 4 is illustrated functioning as a server, the invention may not be so limited and in this regard, various embodiments of the invention the system 400 may also be enabled to function as a client. Referring to FIG. 4, the system 400 may comprise a LAN subsystem 402, an Ethernet connector 318, and a multimedia connector 316. The LAN subsystem 402 may comprise a PCI bus interface 404, a video/Ethernet conversion block 406, a PCI/Ethernet conversion block 426, MAC clients 422a and 422b, timing shim 424, a memory 408, a controller 410, a time stamp block 414, a MAC 412, and an Ethernet PHY 420.

The PCI bus interface 404 may comprise suitable logic, circuitry, and/or code that may enable transmitting and/or receiving data via a PCI (Peripheral Component Interconnect) bus. In this regard, data from, for example, the southbridge 310 of FIG. 3, may be communicated to a network via the LAN system 402. Accordingly, a PCI bus may provide a means for conveying data received via an Ethernet or DP connection to the various components comprising the server 400. Although a PCI bus is used for illustration, any standardized or proprietary bus may be utilized for communication between the server 400 and the LAN subsystem 402 without deviating form the scope of various embodiments of the invention.

The Video/Ethernet conversion block 406 may comprise suitable logic, circuitry, and/or code that may enable converting multimedia and associated auxiliary data from an Ethernet payload format. Video and associated auxiliary data received by the video/Ethernet conversion block 406 from a GPU, for example, may be packetized, depacketized, encapsulated, decapsulated, or otherwise processed so as to be formatted as one or more Ethernet payloads. Similarly, Ethernet payloads received from a MAC client, for example, may be packetized, depacketized, encapsulated, decapsulated, or otherwise processed so as to be formatted as one or more video or multimedia streams. For example, one or more of HDMI datastreams, DVI datastreams, DisplayPort datastreams, raw video, and/or raw audio/video may be extracted and/or reconstructed from one or more Ethernet payloads. Similarly, video/Ethernet conversion block 406 may receive packetized video data and/or audio data, such as DVI, HDMI, or DisplayPort data, and may encapsulate and/or format the data into one or more Ethernet payloads. In some instances, audio may be synchronized to video and may be routed via the GPU. In these instances, both audio and video may be formatted into Ethernet payloads by the video/Ethernet conversion block 406. In various embodiments of the invention, the video/Ethernet conversion block 406 may receive control signals and/or data from the controller 410. Additionally, in various embodiments of the invention the Video/Ethernet conversion block 406 may store data to and/or read data from the memory 408. In various embodiments of the invention, the Video/Ethernet conversion block 406 may be implemented in one or more physical and/or functional blocks. In this regard, various functions implemented by the Video/Ethernet conversion block 406 may be shared and/or separated physically and/or functionally without deviating from the scope of the invention The PCI/Ethernet conversion block 426 may comprise suitable logic, circuitry, and/or code that may enable converting data received to and/or from an Ethernet payload format. In this regard, audio data, for example, received via a PCI bus may be formatted as one or more Ethernet payloads. Similarly, one or more Ethernet payloads may be formatted for transmission via a PCI bus.

In various exemplary embodiments of the invention, the video/Ethernet conversion block 406, the PCI/Ethernet conversion block 404, or other blocks comprising the LAN subsystem 400 may be enabled to perform compression and/or de-compression of video and/or audio content prior to and/or subsequent to packetization, depacketization, encapsulation, decapsulation.

The MAC clients 422a and 422b may each comprise suitable logic, circuitry, and/or code that may enable reception of Ethernet payloads from the video/Ethernet conversion block 406 and/or the PCI/Ethernet conversion block 426 and may enable encapsulating the Ethernet payloads in one or more Ethernet frames. Additionally, the MAC clients 422a and 422b may be enabled to receive Ethernet frames from the MAC 412 and may enable decapsulation of the Ethernet frames to extract Ethernet payloads which may comprise multimedia, auxiliary, control, or general Ethernet data. In this regard, Ethernet payloads may be formatted and/or encapsulated according to one or more protocols. For example, Ethernet payloads may comprise DP micro-packets and/or IP datagrams. In this regard, other protocols may be utilized for the packetization and/or conveyance of data without deviating from the scope of the present invention. In an exemplary embodiment of the invention, multimedia data destined for a remote client may be first packetized into DisplayPort, HDMI, or DVI format. Subsequently, the multimedia data may be directly encapsulated into Ethernet frames. In another embodiment of the invention, the multimedia data may be encapsulated into one or more IP datagrams which may, in turn, be encapsulated into Ethernet Frames. Also, priority and quality of service properties of higher layer protocols may be mapped to physical layer via AVB. In various embodiments of the invention, the MAC clients 422a and 422b may receive control signals and/or data from the controller 410. Additionally, in various embodiments of the invention the MAC clients 422a and 422b may store data to and/or read data from the memory 408. In various embodiments of the invention, the MAC clients 422a and 422b may be implemented in one or more physical and/or functional blocks. In this regard, various functions implemented by the MAC clients 422a and 422b may be shared and/or separated physically and/or functionally without deviating from the scope of the invention.

The timing shim 424 may comprise suitable logic, circuitry and/or code that may enable reception of Ethernet frames the MAC clients 422a and 422b. The timing shim 424 may append time synchronization information, such as a time stamp, to the Ethernet frames. The time stamp shim 424 may, for example, append a time stamp when the Ethertype field indicates that the Ethernet frame is to utilize AV Bridging capabilities for transport across a network. In various embodiments of the invention, the Video/Ethernet conversion block 406 may receive control signals and/or data from the controller 410. Additionally, in various embodiments of the invention the Video/Ethernet conversion block 406 may store data to and/or read data from the memory 408. In various embodiments of the invention, the Video/Ethernet conversion block 406 may be implemented in one or more physical and/or functional blocks. In this regard, various functions implemented by the Video/Ethernet conversion block 406 may be shared and/or separated physically and/or functionally without deviating from the scope of the invention.

The memory 408 may comprise suitable logic, circuitry, and/or code that may enable storage of data. In this regard, the memory 408 may enable buffering received data. Additionally, the memory 408 may enable storage of state variable or other information utilized to control the operations of the LAN subsystem 402.

The controller 410 may comprise suitable logic, circuitry, and/or code that may enable operations of the LAN subsystem 402. In this regard, the controller 410 may be enabled to process data and/or provide control signals/information to enable and/or control operation of the various blocks comprising the LAN subsystem 402.

The MAC 412 may comprise suitable logic, circuitry, and or code that may enable providing addressing and/or access control to a network and may enable the transmission of the Ethernet frames via a network. In this regard, the MAC 412 may be enabled to buffer, prioritize, or otherwise coordinate the transmission and/or reception of data via the Ethernet connector 318 and associated physical link. The MAC 412 may be enabled to perform additional packetization, depacketization, encapsulation, and decapsualtion of data. The MAC 412 may enable generation of header information within the Ethernet frames, which enable the utilization of AVB within a network for transport of the Ethernet frames. The MAC 412 may also enable traffic shaping of transmitted Ethernet frames by determining time instants at which Ethernet frames may be transmitted to a network. The MAC 412 may also enable generation of header information within the Ethernet frames, which utilize conventional Ethernet services. The conventional Ethernet services may not utilize traffic shaping and/or AVB, for example.

In an exemplary transmit operation, data conveyed to the multimedia connector 316 via, for example, a graphics processor or an audio processor, may be packetized into one or more multimedia formats (e.g. DP, DVI, HDMI, etc.) and may be converted to physical symbols and transmitted onto a physical medium via the multimedia connector 316. In this manner, audio, video, and/or control/auxiliary data may be transmitted to a local multimedia client or other multimedia rendering device, for example.

In an exemplary receive operation, symbols received via the multimedia connector 316 may be converted to digital values and assembled into multimedia datastreams (e.g. DP, DVI, HDMI) before being conveyed up to another block, such as a GPU or audio processor, comprising the system 400. In this manner, multimedia streams comprising control/auxiliary data, for example, received from a local multimedia client via the multimedia connector 316 may be de-packetized and the control/auxiliary data may be provided to, for example, the GPU.

The Ethernet PHY 420 may comprise suitable logic, circuitry, and/or code that may enable transmission and/or reception of data bits over a physical medium. The Ethernet PHY 420 may be implemented in one or more physical and/or functional blocks. In this regard, various functions implemented by the Ethernet PHY 420 may be shared and/or separated physically and/or functionally without deviating from the scope of the invention. The Ethernet PHY 420 may be enabled to convert between digital values and analog symbols impressed on the physical medium. Accordingly, received symbols may be converted to digital values and assembled into Ethernet frames before being conveyed up to the MAC 412. Data received from the MAC 412 may be converted to physical symbols and transmitted onto a physical medium. In an exemplary embodiment of the invention, the physical medium may comprise twisted pair or coaxial cabling, and the transmitted symbols may be as defined by Ethernet protocols. In this regard, the Ethernet PHY 420 may enable Ethernet physical layer functionality.

In an exemplary transmit operation, data conveyed to the MAC client 422a or 422b via, for example, the video/Ethernet conversion block 406 or the PCI/Ethernet conversion block 426, may be packetized into one or more Ethernet Frames. Subsequently, the frames may be conveyed to the MAC 412 which, in turn, may convey the frames to the Ethernet PHY 420. The Ethernet PHY 420 may be convert the data to physical symbols and transmit the symbols onto a physical medium via the Ethernet connector 318. In this manner, multimedia and/or general data may be transmitted to a remote client over a network. Ethernet frames may comprise headers which identify a network path over which they are to be transmitted. In this regard, AVB may be utilized to ensure timely delivery of the frames. Additionally, headers comprising the Ethernet frames may comprise information which may be utilized to extract/reconstruct the multimedia and/or general data from the Ethernet datastream.

In an exemplary receive operation, symbols received via the Ethernet connector 318 may be converted to digital values and assembled into Ethernet frames before being conveyed up to a another block, such as the video/Ethernet conversion block 406 or the PCI/Ethernet conversion block 426. In this manner, Ethernet frames comprising control/auxiliary data received from a remote client via the Ethernet connector 318 may be extracted/reconstructed and the control/auxiliary data may be provided to, for example, a GPU or audio processor.

Ethernet frames may comprise headers which identify a network path from which they are received. In this regard, AVB may be utilized to ensure timely delivery of the frames. Additionally, headers comprising the Ethernet frames may comprise information which may be utilized to extract/reconstruct the multimedia and/or general data from the Ethernet datastream.

Figure 5:
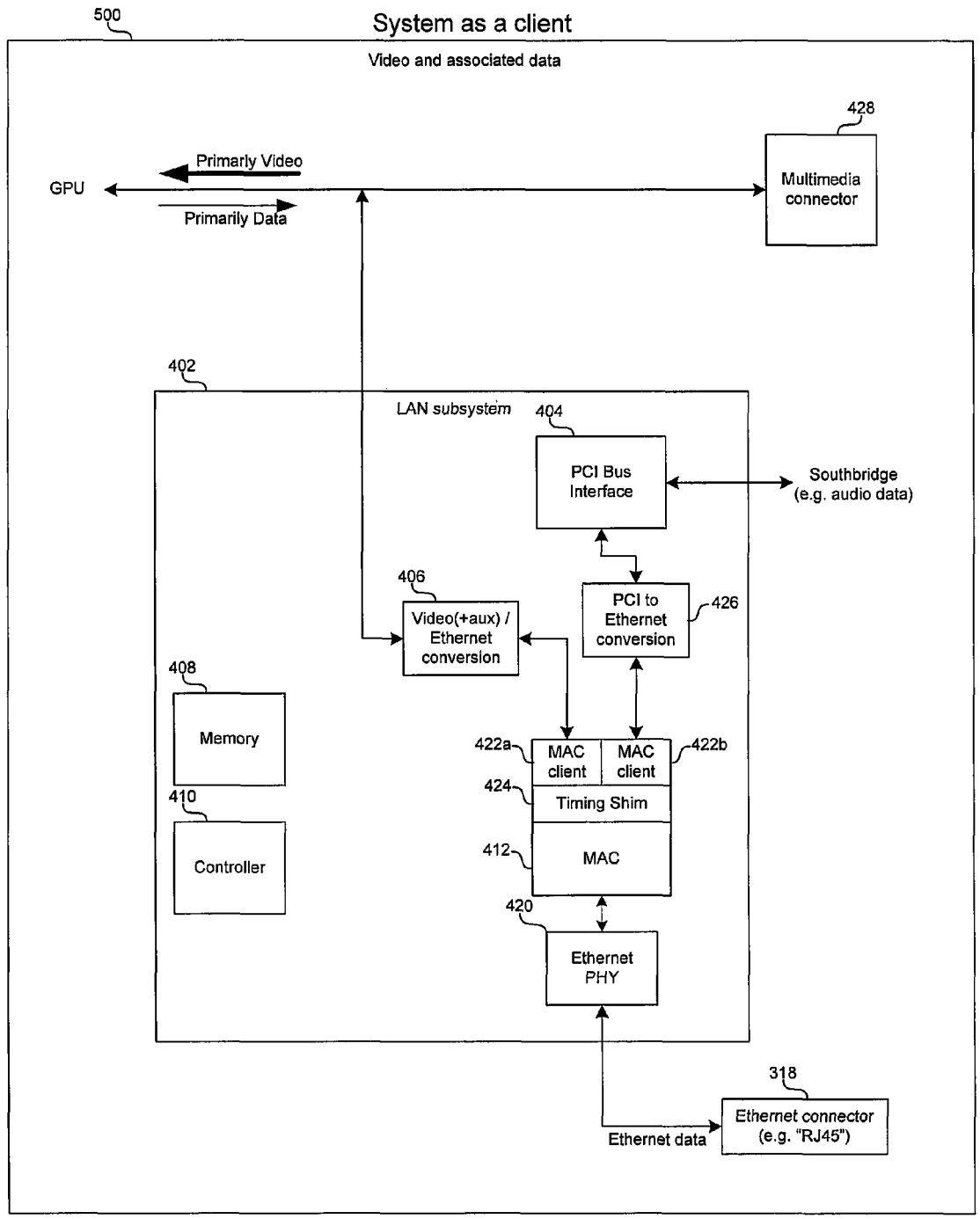
FIG. 5 is a block diagram illustrating an exemplary LAN subsystem of a multimedia client, in accordance with an embodiment of the invention.

FIG. 5 is a block diagram illustrating an exemplary LAN subsystem of a multimedia client, in accordance with an embodiment of the invention. Although the system 500 in FIG. 5 is acting as a client, it is not limited in this regard and in various embodiments the system 500 may also act as a server. Referring to FIG. 5, the system 500 may be similar to the system 400 of FIG. 4.

In operation, a multimedia connection may be established between a remote server, such as the server 400, and a display local to the system 500. Accordingly, the system 500 may be enabled to receive an Ethernet datastream, extract/reconstruct a multimedia datastream from the received Ethernet datastream, and transmit the multimedia datastream to a local display via the multimedia connector 316 or other appropriate block(s) comprising the system 400. In this regard, the system 500 may receive an Ethernet datastream from a remote server which may be transmitting a multimedia datastream to a display that is local to the system 500.

In one embodiment of the invention, multimedia content may be extracted and/or reconstructed directly from received Ethernet frames. Accordingly, the MAC client 422a may extract/reconstruct Ethernet payloads from received Ethernet Frames and convey the payloads to the video/Ethernet conversion block 406 and/or the PCI/Ethernet conversion block 426. In this regard, the video/Ethernet conversion block 406 and/or the PCI/Ethernet conversion block 426 may extract and/or reconstruct the multimedia content, from the Ethernet payloads and convey the multimedia data to an appropriate block(s) comprising the system 500 (e.g. memory or CPU). Additionally, the video/Ethernet conversion block 406 may convey extracted multimedia content to the multimedia connector 316 for transmission to a local display.

In another embodiment of the invention, The Ethernet payloads may comprise IP datagrams. Accordingly, the PCI/Ethernet conversion block 426 and/or the video/Ethernet conversion block 406 may be enabled to determine whether the IP datagrams comprise general Ethernet traffic, or whether the IP datagrams comprise a multimedia datastream. In this regard, the video/Ethernet conversion block 406 may be enabled to extract/reconstruct multimedia data from the IP datagrams and convey the video data to an appropriate block(s) comprising the system 500 (e.g. memory or CPU). Additionally, the video/Ethernet conversion block 406 may convey the micro-packets to the DP the multimedia connector 316 for transmission to the local display. Similarly, the PCI/Ethernet conversion block 426 may be enabled to extract general traffic and/or audio data from the IP datagrams and convey the data to the PCI bus interface 404.

Ethernet frames and/or data comprising the Ethernet frames may be encrypted and the system 500 may be enabled to decrypt the frames and/or data. For example, the system 500 may be enabled to decrypt MACsec secured Ethernet frames, IPsec secured datagrams, and/or video protected utilizing high-bandwidth digital content protection (HDCP).

Figure 6A:
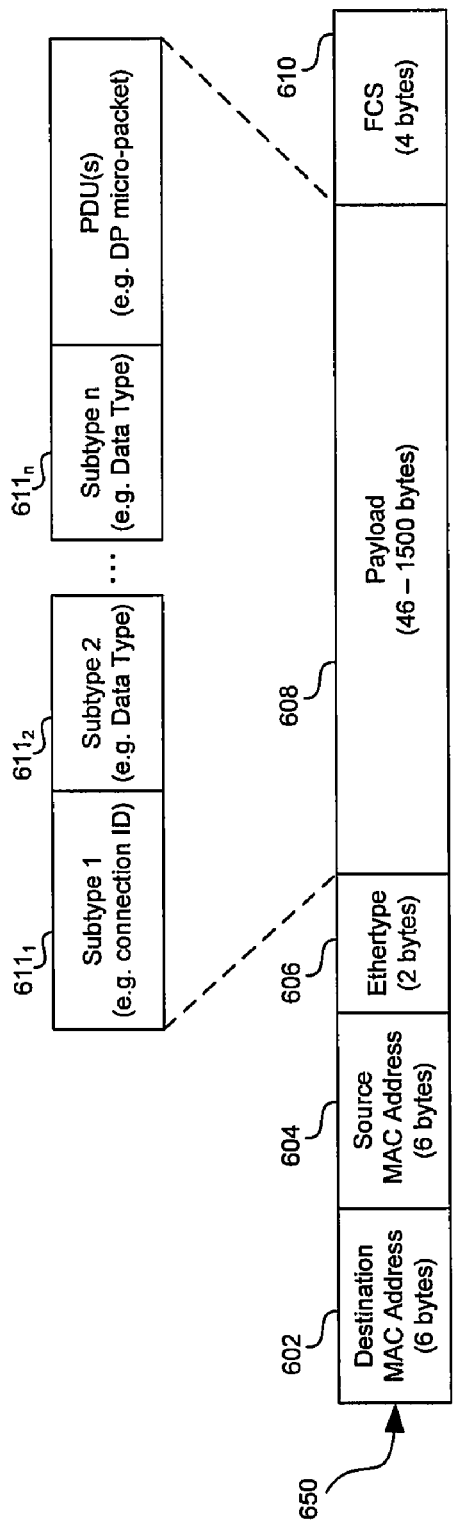
FIG. 6A is a diagram of an exemplary Ethernet frame comprising HD multimedia content, in accordance with an embodiment of the invention.

FIG. 6A is a diagram of an exemplary Ethernet frame comprising HD multimedia content, in accordance with an embodiment of the invention. Referring to FIG. 6, the Ethernet frame 650 may comprise a destination MAC address field 602, a source MAC address field 604, an Ethertype field 606, a payload 608, and a frame check sequence (FCS) 610.

The destination MAC address field 602 may comprise information that may be utilized to identify the node that the packet is to be sent to. The source MAC address 604 field may comprise information that may be utilized to identify the node that originated the packet.

The Ethertype 606 may be utilized to identify the type and/or nature of the data which comprises the payload 608. In one embodiment of the invention, the Ethertype may indicate the payload 608 comprises multimedia content. In another embodiment of the invention, the Ethertype 606 may indicate that the payload 608 comprises multimedia content and may further identify the format (e.g HDMI, DVI, DP) of the multimedia content. In another embodiment of the invention, the Ethertype 606 may identify that the payload comprises multimedia content that has been encapsulated utilizing a higher layer protocol such as IP. In this regard, the information obtained from parsing the Ethertype 606 may be passed up to the IP layer so that the multimedia content may be extracted and/or re-constructed from the IP datagrams.

The payload 608 may contain the data being transmitted. In one embodiment of the invention, the payload 608 may comprise multimedia content such as one or more DP micro-packets, or information extracted form one or more DP micro-packets. In other embodiments of the invention, the payload 608 may comprise one or more IP datagrams and/or other protocol data units. In various embodiments of the invention, the payload may comprise up to 'n' subtype fields 611. In this regard, the payload may comprise a first subtype field $611_1$ which may comprise a Connection ID utilized to identify a multimedia connection, such as a DP connection, to which the frame 650 belongs. In this manner, multiple connections may be supported over a single Ethernet link. The payload may comprise a second subtype $611_2$ which may comprise a Data Type utilized to indicate the type of multimedia content contained in the frame 650. For example, for a frame determined to contain DP data, the Data Type may indicate whether the frame 650 contains video, audio, combined audio/video, and/or auxiliary/control data. In this manner a client receiving the Ethernet frame may, for example, be enabled to output the data onto the correct DP lane. In various embodiments of the invention, the frame 650 may comprise different and/or additional subtypes which may be utilized to indicate, for example, whether a frame contains multimedia content, format of multimedia content, whether multimedia content has been compressed, algorithms used for compressing multimedia content, whether multimedia content has been encrypted, algorithms and/or keys utilized for encrypting/decrypting multimedia content, etc.

The FCS 210 may comprise information that may be utilized to provide error detection for the packet. The FCS 210 may comprise, for example, a CRC or a checksum.

In an exemplary operation, when a packet such as the Ethernet frame 600 arrives at a network node, the Ethertype 606 may be parsed and the frame may be identified as comprising multimedia data. After parsing the Ethertype 606, the first subtype (connection ID) $611_1$ may be parsed to identify which DP connection the frame belongs to. Subsequently, the second subtype (Data Type) $611_2$ may be parsed to identify the DP lane on which the data should be output. In some instances, the Ethertype field 606 may indicate whether the payload of the frame comprises DP micro-packets directly, or if an intermediary protocol data unit. If the frame comprises an intermediary protocol data unit, such as an IP datagram, then the Ethertype 606, the connection ID $611_1$, and/or the Data Type $611_2$ may be passed up the protocol stack along with the protocol data unit.

Figure 6B:
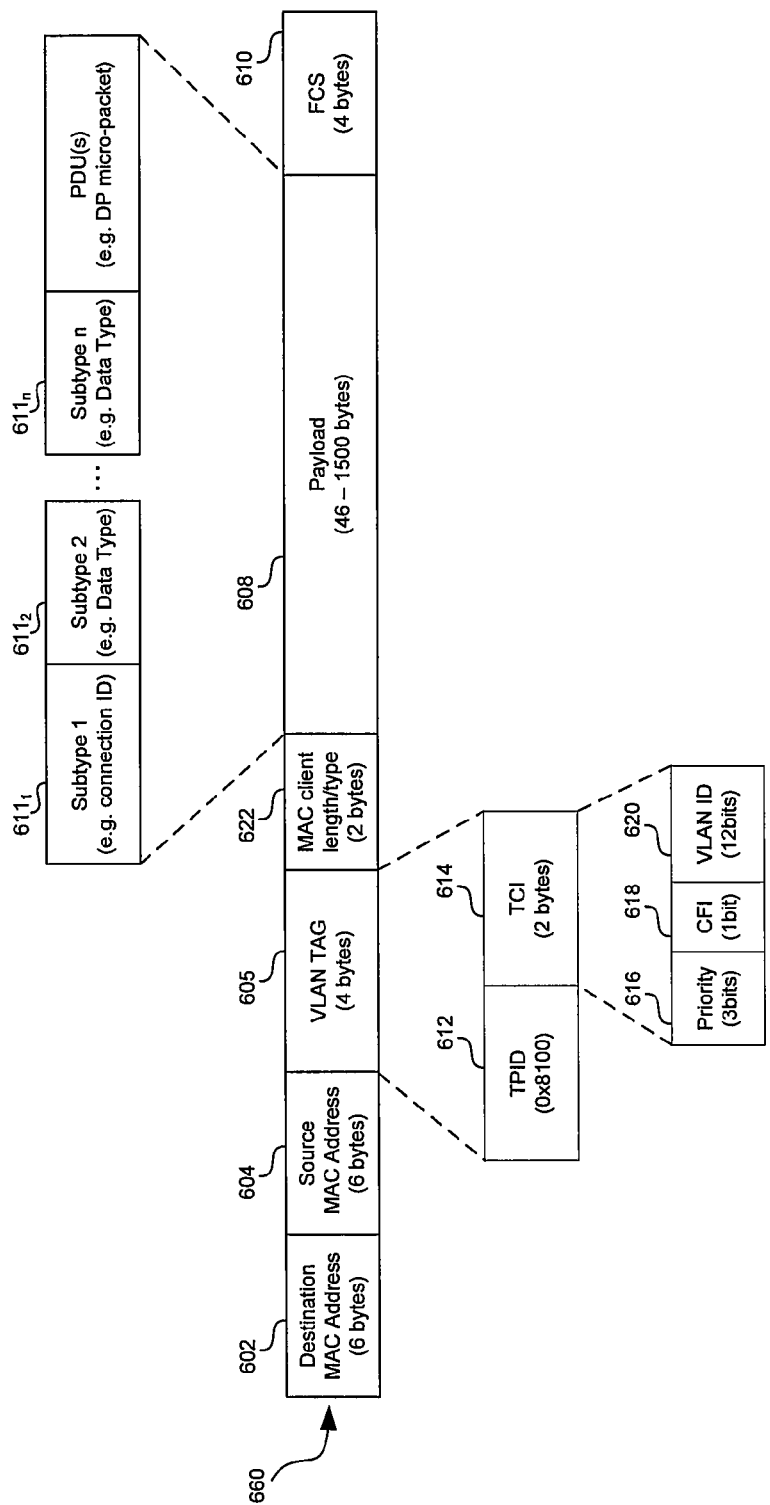
FIG. 6B is a diagram of an exemplary VLAN tagged Ethernet frame comprising multimedia content, in accordance with an embodiment of the invention.

FIG. 6B is a diagram of an exemplary VLAN tagged Ethernet frame comprising multimedia content, in accordance with an embodiment of the invention. Referring to FIG. 6B there is shown a frame 660 which is similar to the frame 6650 but with a VLAN tag 605 inserted after the destination address 604.

The VLAN tag 605 may comprise a TPID 612 and a tag control information (TCI) field 614. The TPID 612 may comprise a numerical identifier, similar to or the same as an Ethertype, which may indicate that the frame 660 has been VLAN tagged so that the frame 660 may be parsed accordingly. An exemplary numerical identifier may comprise 0x8100. The TCI field 614 may comprise a priority field 616, a canonical format indicator (CFI) 618, and a VLAN ID 620. The CFI 618 may be used to provide compatibility between Ethernet and token ring networks. The VLAN ID 620 may comprise a numerical identifier corresponding to the VLAN with which the frame 660 is associated. The priority field 616 may indicate a level of urgency associate with the frame 660. In this regard, frames transmitted utilizing Audio/Video Bridging and/or Audio/Video Bridging Extensions (collectively referred to herein as AVB), for example, may tag frames as depicted in FIG. 6B such that the priority field may be utilized in allocating resources for AVB streams.

The MAC client length/type field 622 may be similar to or the same as the Ethertype field 606. In this regard, when the frame 660 is parsed, the VLAN tag 605 may be removed and the length/type field 622 may be shifted over and become the Ethertype 606. In this manner, when a frame is VLAN tagged, the information comprising the Ethertype field 606 may be preserved in the MAC client length/type field 622.

Figure 7:
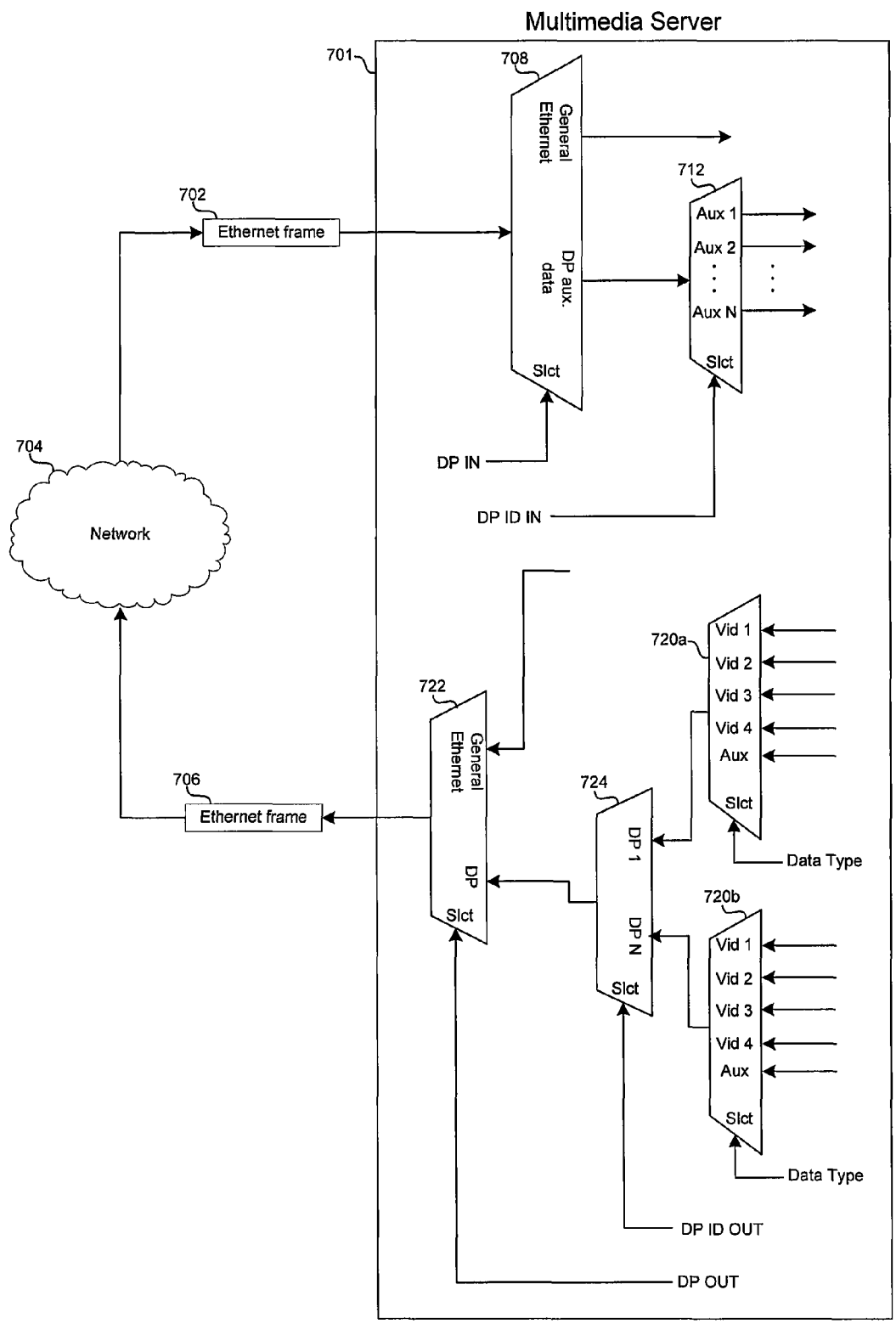
FIG. 7 is a logical diagram of the flow of Ethernet traffic to/from a HD multimedia and Ethernet enabled server, in accordance with an embodiment of the invention.

FIG. 7 is a logical diagram of the flow of Ethernet traffic to/from a HD multimedia and Ethernet enabled server, in accordance with an embodiment of the invention. Referring to FIG. 7, there is shown a server 701 which transmits multimedia data to a network 704. In this regard, one or more DP connections, similar to the DP connection over Ethernet described in FIG. 2, may exist between the server 701 and one or more clients comprising the network 704. The server 701 may transmit general Ethernet traffic as well as Ethernet frames containing DP micro-packets. Accordingly, the server 701 may receive auxiliary data over the DP connection. Although DisplayPort is utilized for illustration purposes, any multimedia format (e.g. DVI or HDMI) may be utilized without deviating from the scope of the invention.

The switching blocks 720a and 720b may function in such a manner as to enable the multiplexing of the multiple lanes comprising a DP connection into egress Ethernet frames, such as the egress frame 706. In this regard, a DP lane from which data is placed into egress Ethernet frame 706 may be selected by a Data Type signal. For example, a Data Type value of 1 to 5 may select video lane 1 to 5, respectively (1 through 4 being video lanes and 5 being the auxiliary lane). Accordingly, the value of Data Type associated with a block of data may be placed into a subtype field prepended to the payload of the egress Ethernet frame 706, as illustrated in FIG. 6.

The switching block 724 may function in such a manner as to enable the multiplexing of multiple DP connections into egress Ethernet frames, such as the egress packet 706. In this regard, a DP Connection for which data is placed into the Egress frame 706 may be selected by a DP ID OUT signal. For example, a DP ID OUT value of 1 to 'N' may select DP connections 1 to 'N', respectively. Accordingly, the value of DP ID OUT associated with a block of data may be placed into a subtype field prepended to the payload of the egress Ethernet frame 706, as illustrated in FIG. 6.

The switching block 722 may function in such a manner as to enable the multiplexing of DP traffic and general Ethernet traffic into egress Ethernet frames, such as the egress Ethernet frame 706. In this regard, the egress Ethernet frame 706 may comprise general Ethernet traffic or DP traffic depending on the value of the DP OUT signal. For example, the DP OUT signal being asserted may result in the egress Ethernet frame 702 comprising DP data.

The switching block 708 may function in such a manner as to enable the de-multiplexing of DP traffic and general Ethernet traffic contained in ingress Ethernet frames, such as the ingress Ethernet frame 702. In this regard, the ingress Ethernet frame 702 may be parsed and it may be determined whether the frame comprises a multimedia Ethertype, as in FIG. 6. For example, if the frame 702 comprises a DisplayPort Ethertype, the frame 702 may be routed to the switching element 712. If the frame 702 does not comprise a DisplayPort Ethertype, it may be routed as general Ethernet traffic.

The switching block 712 may function in such a manner as to enable the de-multiplexing of received auxiliary data from 'N' DP connections. In this regard, the ingress Ethernet frame 702 may be parsed to determine the DP connection ID and the value of DP ID IN may corresponds to the value of the DP connection ID. Accordingly, auxiliary data contained in the ingress Ethernet frame 702 may be routed to the appropriate destination.

Figure 8:
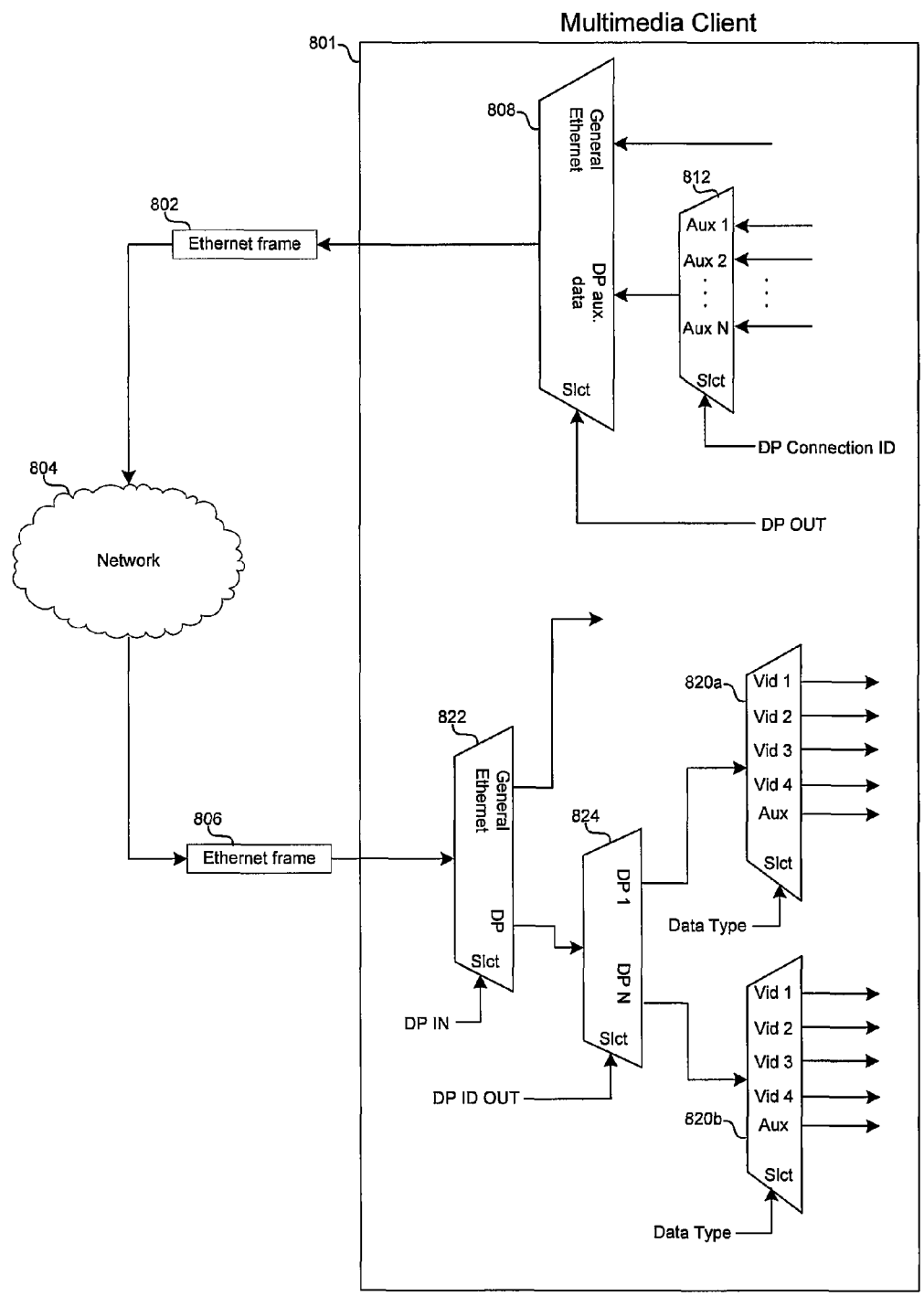
FIG. 8 is a logical diagram of the flow of Ethernet traffic to/from a HD multimedia and Ethernet enabled client, in accordance with an embodiment of the invention.

FIG. 8 is a logical diagram of the flow of Ethernet traffic to/from a HD multimedia and Ethernet enabled client, in accordance with an embodiment of the invention. Referring to FIG. 8, there is shown a client 801 which receives multimedia data from a network 804. In this regard, one or more DP connections, similar to the DP connection over Ethernet described in FIG. 2, may exist between the client 801 and one or more servers comprising the network 802. The client 801 may receive general Ethernet traffic as well as Ethernet frames containing DP micro-packets. Accordingly, the client 801 may transmit auxiliary data over the DP connection. Although DisplayPort is utilized for illustration purposes, any multimedia format (e.g. DVI or HDMI) may be utilized without deviating from the scope of the invention.

The switching blocks 820a and 820b may function in such a manner as to enable the de-multiplexing of DP data contained in the Ethernet frame 806 onto the lanes comprising each DP connection. In this regard, the ingress frame 806 may be parsed and the Data Type may be determined. A Data Type value of 1 to 5 may select lanes 1 to 5, respectively. Accordingly, the DP data comprising the ingress Ethernet frame 806 may be conveyed via the appropriate lane.

The switching block 824 may function in such a manner as to enable the de-multiplexing of the ingress Ethernet frame 806 onto multiple DP connections. In this regard, the ingress frame 806 may be parsed to determine the DP connection ID. In this regard, a DP connection ID of 1 to 'N' may select DP connection 1 to 'N', respectively. Accordingly, the DP data contained in the ingress Ethernet frame 806 may be routed to the appropriate DP connection.

The switching block 822 may function in such a manner as to enable the de-multiplexing of DP traffic and general Ethernet traffic contained in the ingress Ethernet frame 806. In this regard, the ingress Ethernet frame 806 may be parsed to determine, for example, if it comprises a multimedia Ethertype, as in FIG. 6. Accordingly, if the ingress Ethernet frame 806 comprises a DisplayPort Ethertype then the DP data contained in the ingress Ethernet frame 806 may be routed to the switching block 824. If the ingress Ethernet frame 806 does not comprise a DisplayPort Ethertype, then the data contained in the ingress Ethernet frame 806 may be routed as general Ethernet traffic.

The switching block 808 may function in such a manner as to enable the multiplexing of DP traffic and general Ethernet traffic into egress Ethernet frames, such as the egress Ethernet frame 802. In this regard, the value of the DP OUT signal may determine the type of traffic placed into the egress Ethernet frame 802.

The switching block 812 may function in such a manner as to enable the multiplexing of auxiliary data from 'N' DP connections into egress Ethernet frames, such as the egress Ethernet frame 802. In this regard, the value of a DP ID OUT signal may determine a DP connection from which auxiliary data is placed into the egress frame 802. Accordingly, the value of DP connection ID may be placed into the egress Ethernet frame 802, as illustrated in FIGS. 6A and 6B. Additionally, a Data Type indicating auxiliary data may be placed into the Egress Ethernet frame 802, as illustrated in FIGS. 6A and 6B.

Aspects of a method and system for managing HD multimedia traffic over Ethernet are provided. In this regard, multimedia traffic comprising one or more Ethernet frames may be identified via one or more headers comprising the frames and processed according to the identification. In this regard, general Ethernet traffic may be multiplexed into egress frames, such as the frame 706 and 806 of FIGS. 7 and 8, based on the identification. Similarly, ingress Ethernet frames, such as the frames 702 and 802, may be demultiplexed into multimedia traffic and general traffic based on the identification. Headers utilized to identify and/or route multimedia traffic and general traffic may comprise an Ethertype field, such as the Ethertype 606 of FIG. 6, and/or one or more subtypes, such as the subtypes 611. Headers utilized to identify and/or route multimedia traffic and general traffic may comprise a connection identifier field, such as the connection identifier 611 of FIG. 6. Similarly, Headers utilized to identify and/or route multimedia traffic and general traffic may comprise a data type field, such as the data type field 613 of FIG. 6.

Another embodiment of the invention may provide a machine-readable storage, having stored thereon, a computer program having at least one code section executable by a machine, thereby causing the machine to perform the steps as described herein for managing HD multimedia traffic over Ethernet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information, the method comprising:
   performing by one or more circuits and/or processors in a network device:
      determining whether an Ethernet frame includes DisplayPort traffic based on an Ethertype field of said Ethernet frame, said Ethertype field being separate from a payload of said Ethernet frame; and
      demultiplexing said DisplayPort traffic based on a plurality of subtype fields in said payload of said Ethernet frame, wherein a first of said plurality of subtype fields identifies a connection identifier for said DisplayPort traffic and a second of said plurality of subtype fields identifies a type of multimedia content in said DisplayPort traffic.

2. The method according to claim 1, wherein said Ethernet frame is generated by multiplexing one or more DisplayPort streams into said Ethernet frames and inserting said Ethertype and said plurality of subtypes fields into said Ethernet frame.

3. The method according to claim 1, comprising demultiplexing said Ethernet frame into general Ethernet traffic and said DisplayPort traffic based on said Ethertype field.

4. The method according to claim 1, wherein said second of said plurality of subtype fields identifies said type of multimedia content as audio and/or video traffic.

5. The method according to claim 1, wherein
   said second of said plurality of subtype fields identifies said type of multimedia content as auxiliary traffic.

6. The method according to claim 1, wherein said connection identifier is used to generate a selection signal for a switching block.

7. The method according to claim 1, wherein:
   said second of said plurality of subtype fields identifies a lane of a DisplayPort interface.

8. The method according to claim 1, wherein
   said payload includes DisplayPort mini-packets.

9. The method according to claim 1, wherein said de-multiplexing comprises de-multiplexing in an Ethernet to DisplayPort conversion module.

10. The method according to claim 1, wherein
   said DisplayPort traffic is demultiplexed onto a plurality of DisplayPort lanes.

11. A machine-readable storage having stored thereon, a computer program having at least one code section for enabling communication of information, the at least one code section being executable by a machine for causing the machine to perform steps comprising:
   receiving an Ethernet frame;
   retrieving contents of an Ethertype field contained in a header of said Ethernet frame;

switching traffic contained in said Ethernet frame to a first path for processing Ethernet traffic when said contents of said Ethertype field does not indicate a multimedia traffic type;

switching traffic contained in said Ethernet frame to a second path for processing multimedia traffic when said contents of said Ethertype field indicate a multimedia traffic type; and for said traffic that is switched to said second path, demultiplexing said switched traffic based on a plurality of subtype fields in a payload of said Ethernet frame, wherein a first of said plurality of subtype fields indicate a type of multimedia content.

12. The machine-readable storage according to claim 11, wherein said first of said plurality of subtype fields indicate whether said traffic is video content.

13. The machine-readable storage according to claim 11, wherein said first of said plurality of subtype fields indicate whether said traffic is audio content.

14. The machine-readable storage according to claim 11, wherein said first of said plurality of subtype fields indicate whether said traffic is auxiliary control data.

15. The machine-readable storage according to claim 11, wherein a second of said plurality of subtype fields indicate a format of said traffic.

16. The machine-readable storage according to claim 11, wherein a second of said plurality of subtype fields contains a connection identifier.

17. The machine-readable storage according to claim 11, wherein a second of said plurality of subtype fields indicate whether said traffic has been compressed.

18. The machine-readable storage according to claim 11, wherein a second of said plurality of subtype fields indicate whether said traffic has been encrypted.

19. The machine-readable storage according to claim 11, wherein said first of said plurality of subtype fields indicate a lane of a DisplayPort interface.

20. The machine-readable storage according to claim 11, wherein:
said multimedia traffic is formatted so as to be compliant with one or more DisplayPort protocols; and
said DisplayPort formatted multimedia traffic is demultiplexed onto a plurality of DisplayPort lanes.

21. A system for enabling communication of information, the system comprising:
one or more circuits and/or processors for use in an Ethernet network, said one or more circuits and/or processors being operable to:
switch traffic contained in an Ethernet frame to a first path when contents of an Ethertype field of a header of said Ethernet frame does not indicate a multimedia traffic type;
switch traffic contained in said Ethernet frame to a second path when said contents of said Ethertype field indicate a multimedia traffic type; and
for said traffic that is switched to said second path, demultiplex said traffic based on a plurality of subtype fields in a payload of said Ethernet frame, wherein a first of said plurality of subtype fields indicate a connection identifier that identifies a connection to which said Ethernet frame belongs.

22. The system according to claim 21, wherein said Ethernet frame contains DisplayPort traffic.

23. The system according to claim 21, wherein said first path is for general Ethernet traffic.

24. The system according to claim 21, wherein said Ethertype identifies a particular format of said traffic.

25. The system according to claim 21, wherein a second of said plurality of subtype fields indicate whether said traffic is video content.

26. The system according to claim 21, wherein a second of said plurality of subtype fields indicate whether said traffic is audio content.

27. The system according to claim 26, wherein a second of said plurality of subtype fields indicate whether said traffic is auxiliary control data.

28. The system according to claim 21, wherein a second of said plurality of subtype fields indicate a format of said traffic.

29. The system according to claim 21, wherein a second of said plurality of subtype fields indicate whether said traffic has been compressed.

30. The system according to claim 21, wherein a second of said plurality of subtype fields indicate whether said traffic has been encrypted.

* * * * *